March 26, 1935.   B. W. KEESE   1,995,987
STEERING WHEEL DRIVE FOR VEHICLES
Filed June 10, 1931   2 Sheets-Sheet 2
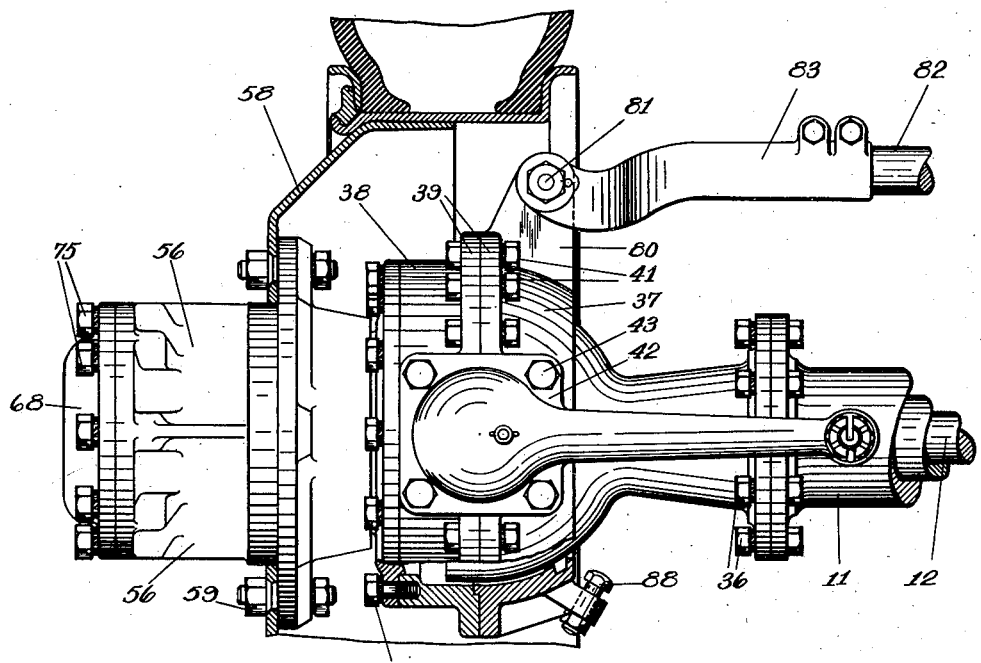
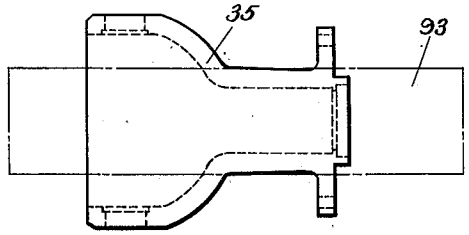
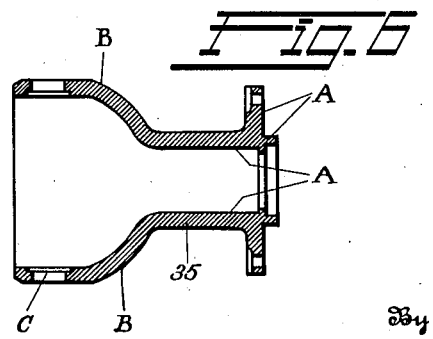
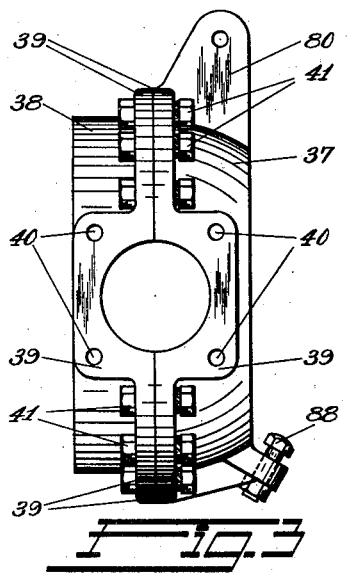
Inventor
Beverly W. Keese
By Strauck & Hoffman
Attorneys Patented Mar. 26, 1935

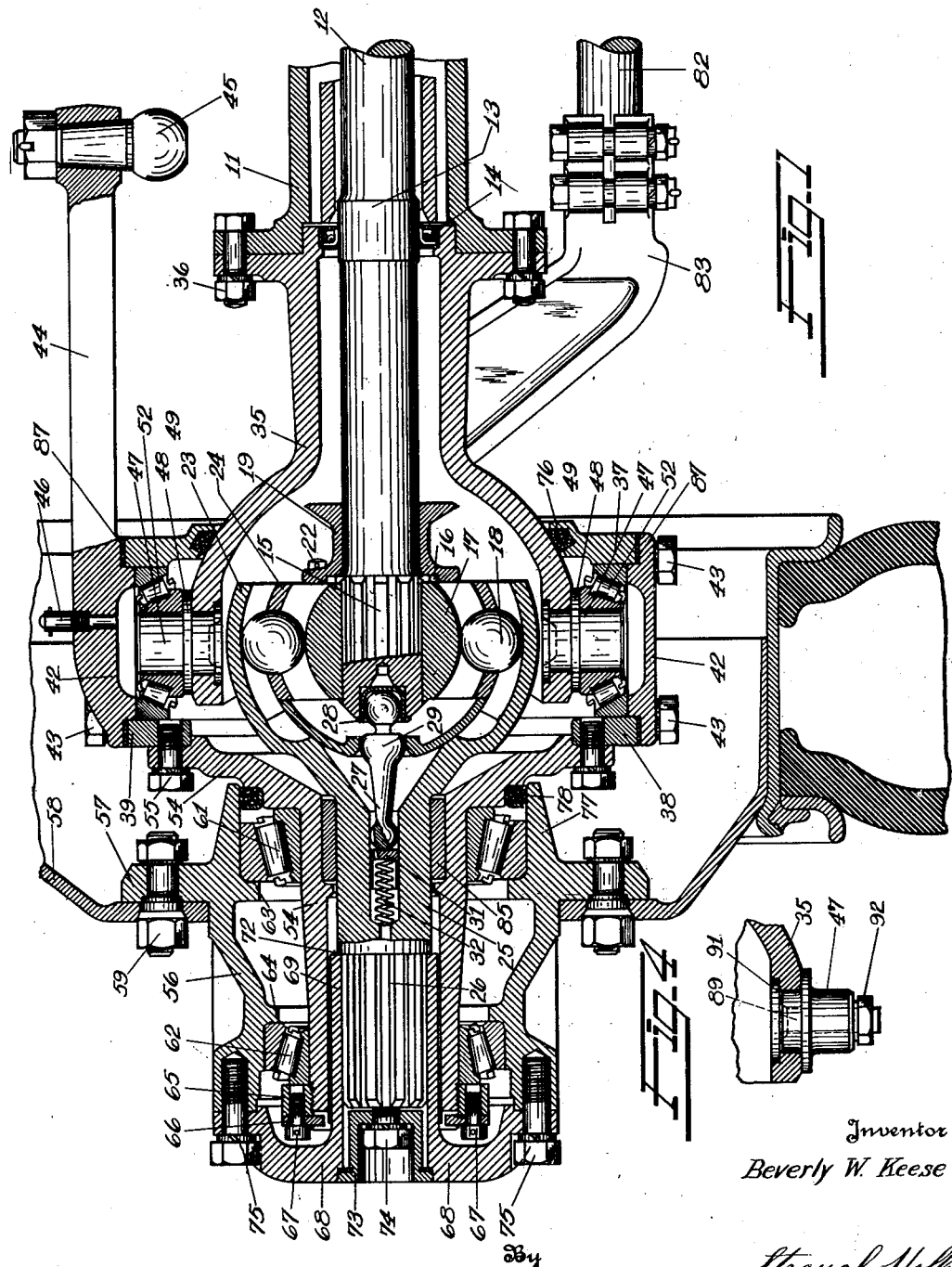

1,995,987

UNITED STATES PATENT OFFICE 1,995,987

STEERING WHEEL DRIVE FOR VEHICLES

Beverly W. Keese, Oshkosh, Wis., assignor to Timken-Detroit Axle Company, Detroit, Mich., a corporation of Ohio Application June 10, 1931, Serial No. 543,429

5 Claims. (Cl. 180—43)

This invention relates to a wheel mounting for vehicles and more particularly to a mounting for driven wheels which may be oscillated for steering the vehicle.

One object of this invention is to provide an efficient design for driven steering wheels of vehicles which is more economical to build and more accessible for disassembly, repairs and adjustments than prior designs.

Another object of this invention is to provide a design for driven steering wheels of vehicles embodying a non-accelerating universal joint whereby an efficient and rugged drive is obtained and one which is very durable in use.

Another object of this invention is to provide a driven steering wheel of extremely compact design wherein the center line of the wheel is brought close to the center line of the steering pivot.

A further object of this invention is to provide a driven steering wheel embodying a universal joint suspended in the wheel bearings, whereby all thrust is taken by these bearings, resulting in the elimination of all thrust washers with their inherent friction.

A further object of this invention is to provide a driven steering wheel embodying a separate wheel spindle permitting a simpler forging, less expensive machining, ease of hardening, and easier assembly.

A further object of this invention is to provide a driven steering wheel having a universal joint housed in a split casing having a vertical joint, resulting in a stronger construction whereby the parts may be of lighter and less expensive materials, and easier to machine and assemble.

A further object is to provide a driven steering wheel having a universal driving mechanism encased within a vertically split housing having a cover plate for enclosing the wheel bearings, the cover plate having an arm to which a steering rod may be secured.

A further object of the invention is to provide a driven steering wheel having a universal joint encased in a simplified housing which is easier to forge as it has no trunnions thereon, is cheaper to machine, may be made of cheaper and lighter metal, and does not require hardening and consequent distortion and discarding of some forgings.

A further object of the invention is to provide a driven steering wheel having a universal joint wherein the wheel spindle is separate from the steering trunnion, thus allowing removal of the universal joint and wheel spindle without disturbing the trunnion bearing adjustments and steering connections, and furthermore permitting simple replacements and adjustments of the trunnions.

A further object is to provide a driven steering wheel wherein a tie rod is pivoted to two such wheels for simultaneous steering, the parts being so arranged that a relatively small thrust is imposed on the rod pivot at all times to thus take up the necessary play between the parts and prevent shimmying of the wheels, this thrust however being insufficient to cause hard steering.

A further object of the invention is to provide a driven steering wheel construction embodying a universal joint and a housing therefor wherein separate steering trunnions are used which may be separately machined and hardened, which may therefore be made of special quality steel, and which may be replaced when worn out without discarding other parts.

These and various other objects of this invention will be apparent from the following description and appended claims when taken in connection with the accompanying drawings wherein:

Figure 1 is a vertical section of the invention as applied to one wheel.

Figure 2 is a plan view on a reduced scale, the wheel and tire being shown in section, and part of the universal joint housing being broken away.

Figure 3 is a plan of the two casings which make up the universal joint housing.

Figure 4 is a broken section showing a modified form of mounting for the trunnions.

Figure 5 shows diagrammatically the universal joint housing and the bar from which it is forged.

Figure 6 illustrates the machining operation on the universal joint housing.

Referring to the drawings wherein like parts are designated by the same reference characters, an axle housing 11 is supported in any suitable manner on the vehicle and is adapted to support a drive axle 12, which is driven by the engine of the vehicle in any suitable manner. The drive axle 12 has a slightly enlarged portion 13 with which the lubricant sealing device 14 cooperates to prevent the escape of lubricant from the universal joint housing described hereinafter. At its inner end the axle 12 has spline teeth 15 extending beyond an outwardly extending flange 16. Spline teeth 15 are removably connected to the inner member 17 of a non-accelerating universal joint. Member 17 has a spherical exterior surface, and said surface is provided, with a plurality of ball receiving grooves in each of which is positioned a ball 18. Shaft 12 is retained in association with the inner ball race member 17 by a flanged sleeve 19 surrounding shaft 12 and secured to the inner member 17 by bolts 22, the sleeve 19 cooperating with flange 16 of the axle to hold the axle and inner member 17 in assembled relation.

Inner race member 17 of the universal joint is positioned within the outer race member 23 thereof which has similar ball receiving grooves in its spherical inner face for reception of the balls 18. The balls 18 are received within circular openings in a ball cage 24 to retain the balls within the two grooves of the inner and outer members. The outer joint member 23 has a stub shaft 25 integral therewith and having the spline teeth 26 at its outer end.

In order to provide a non-accelerating drive when the wheels are turned during steering of the vehicle, the universal joint is provided with six or eight balls 18, thus giving six or eight axes about which the universal may turn. In order to attain a non-accelerating drive, it is necessary that the axes about which the universal joint turns be so arranged as to bisect the angle between the driving and driven members. In the type of joint above described, the balls 18 automatically maintain themselves in a position whereby they form a pivotal axis which bisects the axis between axle 12 and stub shaft 25. In order to assist this angular arrangement, a pilot lever 27 is provided which has a ball and socket mounting in the stub shaft 25 and a similar ball and socket connection with driven axle 12. The ball end of lever 27 is positioned in a cup member 28 which may be replaced when worn. Pilot lever 27 is provided with a ball 29 intermediate its ends which is received within a spherical opening in the ball cage 24. When the wheel is turned and the universal joint turns, the pilot lever 27 assumes an angle with respect to the axle 12 and shaft 25 to assist in automatically positioning the cage 24 and therefore the balls 18 such that the balls are positioned in a plane which bisects the angle between the axle 12 and the shaft 25 to give a uniform and non-accelerating drive.

The end of pilot lever 27 is engaged by a collar 31 which is spring pressed forwardly by spring 32. The shaft 25 is provided with a central opening therethrough as seen in Figure 1 in which is received the end of the pilot lever 27, the sleeve 31 and the spring 32. This opening extends completely through the shaft for providing a path for lubricant, the sleeve 31 and the ball end of pilot lever 27 being provided with slots to allow the passage of lubricant.

The universal joint including the inner member 17, outer member 23, and balls 18 is contained within a closed housing composed of three casings. The housing embodies the member 35 which surrounds the end of axle 12 and is secured to axle housing 11 by bolts 36. The opposite end of member 35 is formed as a hollow spherical casing partially surrounding the universal joint. The enclosure for the universal joint is completed by the two mating casings 37 and 38 which have outwardly extending flanges 39 secured together by bolts 41 (see Figures 2 and 3). The joint between casings 37 and 38 is substantially vertical, thus providing a much stronger design, yet cheaper to build and easier to assemble.

Flanges 39 of housing members 37 and 38 each have two semi-circular openings together defining opposite bosses with open ends. The openings thus defined are diametrically opposite and flanges 39 have bolt holes 40 to receive bolts 43 securing demountable caps 42 to both housing members, each cap 42 being provided with an inwardly extending annular portion which is received within its respective circular opening of the housing defined by members 37 and 38. The upper cap member 42 is provided with an integral arm 44 which extends inwardly of the vehicle and is adapted to carry a steering knuckle 45 for steering the vehicle by turning the wheel. It will be noted that the casting and machining of casings 37 and 38 is simplified since a separate steering arm need not be formed on the casings, the cap 42 which is rigidly secured to both casings carrying the steering arm. A further advantage is that if the steering arm becomes bent due to an accident or its pivot bearing becomes worn and therefore loose, a new cap may be easily substituted without discarding the universal joint housing. The upper cap 42 is further provided with an opening for receiving a lubricant attachment 46 whereby grease or oil may be easily inserted into the universal joint housing and the various bearings.

The housing member 35 is provided with oppositely spaced openings beneath the caps 42 for the removable reception of trunnions 47. Each trunnion 47 may be made of special hardened steel, whereas the housing 35 may be forged from less expensive steel. Each trunnion has an intermediate flange 48 engaged with the upper face of housing 35 and a depending portion 49 having a pressed fit with the opening in housing 35. After the trunnions are pressed into the openings, the lower ends are riveted over to form lower locking flanges 50, which if desirable may then be welded to the housing 35. However, the combined press fit and riveting construction is generally sufficient.

Moreover, in some lighter constructions such as used on small passenger cars, a pressed fit for trunnions 47 is sufficient in which case the riveted flange 50 is omitted. When the pressed fit only is used, replacement of trunnions 47 is facilitated, since the trunnions may be removed by removing caps 42, without disassembling the entire construction.

The intermediate flange 48 of each trunnion 47 is adapted to support the inner race-way of a roller bearing 52. The outer ends of trunnions 47 project into the bosses defined by the openings in flanges 39. The outer race-way of each bearing 52 is adapted to be engaged by the inwardly projecting annular portion of caps 42. Removable shims 87 are adapted to be positioned between the outwardly extending flanges of caps 42 and flanges 39, the shims 87 also functioning as gaskets to prevent loss of lubricant. By insertion or removal of shims 87 the caps 42 may be adjusted to thereby adjust bearings 52. The bearings 52 may be readily slipped into the circular openings or bosses defined by flanges 39, whereby new bearings may be easily inserted by removing caps 42. The bearings 52 are combined antifriction and thrust bearings, serving to reduce the friction between the universal joint housing and trunnions 47 and also taking all thrust of the wheel. It will be noted from Figure 1 that the wheel which contacts with the road surface is so mounted that the thrust between the same and the vehicle frame is transmitted through the thrust roller bearing 52. By this construction it is possible to eliminate all additional thrust washers or bearings with the inherent friction attendant upon the use of the same.

A spindle 54 is connected to the housing member 38 by bolts 55, the spindle 54 surrounding the shaft 25 of the universal joint. The hub 56 of the wheel has an outstanding flange 57 to which wheel 58, such as a disk wheel, is secured by bolts 59. The hub 56 is supported from the spindle 54 by two roller bearings 61 and 62, the bearing 61 being retained between a flange 63 of the hub 56 and a portion of the spindle 54 as seen in Figure 1. Roller bearing 62 is retained against a flange 64 on hub 56, the inner race-way thereof being adjustably retained by a collar 65 threaded on the end of spindle 54, the collar 65 being maintained in adjusted position by a washer 66 having a tongue received in a corresponding groove in the end of spindle 54 and being locked to the collar 65 by bolts 67.

The hub is provided with a driving flange 68 having an inwardly extending sleeve 69 which is splined on its interior surface for cooperative engagement with the spline 26 on shaft 25. The sleeve 69 of the driving flange 68 is adapted to engage a shoulder 72 on the shaft 25 and is retained against the said shoulder by a clamping cap 73 which is held in position by a bolt 74 engaging the end of shaft 25. By means of the clamping cap 73 rigidly connected to one member of the universal joint, the joint is held against longitudinal displacement with respect to hub 56 and the driving flange 68.

The driving flange 68 is secured by bolts 75 to the hub 56 of the wheel. In order to retain the lubricant within the universal joint and the driving mechanism, the housing member 37 is provided with an annular slot in which packing 76 is positioned for engagement with the outer spherical surface of the housing member 35. Furthermore the hub 56 has an axially extending sleeve 77 for retaining a packing 78 in engagement with a notched portion of the spindle 54.

Steering of the vehicle is effected by oscillation of the steering arm 44 thus oscillating the upper cap member 42 to cause movement of the housing members 37 and 38 and corresponding movement of the spindle 54 about the trunnions 47 as a pivotal axis.

The housing member 37 has an outwardly extending arm 80 carrying a suitable pivot pin 81 to which is pivotally mounted the yoke 83 connected to tie rod 82. The tie rod 82 extends to the opposite steering wheel and is similarly connected thereto to cause simultaneous oscillation of the wheels for steering.

Since there must be a small clearance between pivot pin 81 and yoke 83 to prevent binding of the parts and to allow lubrication thereof, if the pin 81 were positioned in the vertical plane defined by the trunnion 47 there would be a tendency for the wheels to oscillate or to shimmy. In order to prevent this undesirable movement of the front wheels, it will be noted from Figure 2 that the pin 81 is offset to the right from the trunnion 47, and the wheel axis is offset to the left thereof. By this construction the whole design is made compact since the wheel axis is closely adjacent the vertical axis defined by trunnion 47, and yet the shimmying of the wheels is prevented since the thrust of the wheels is sufficient to take up the clearance around the pin 81 to cause a slight leverage or drag on the pin, thus absorbing the pivot pin clearance and resulting in a pre-loading of the same and preventing all tendency of the wheels to shimmy. However, the offset of the wheel must not be sufficient to result in hard steering of the vehicle, which is an inherent defect in certain designs wherein the drag on the steering pins and steering knuckles and the tie rod is excessive.

If the size of the universal joint is such as to require additional support for the shaft 25 thereof a bushing 85 may be positioned within the spindle 54 to provide an additional support for the shaft. An adjustable stop bolt 88 is mounted on housing 37 to engage stationary housing 35 to thereby limit the turning movement of the wheels, a similar stop being provided on the opposite wheel.

It is believed that operation of the steering drive wheel mechanism will be clearly understood from the above description. Driving rotation of axle 12 is imparted to the inner member 17 of the universal joint and then by way of the multiplicity of balls 18 to the outer member 23. Rotation of the outer member 23 causes rotation of the shaft 25 which, due to the splined connection 26, causes similar rotation of the driving flange 68 of the hub 56. The spindle 54 provides a bearing for the stub axle 25 by way of the bearing sleeve 85, and furthermore supports the inner raceways of the roller bearings 61 and 62 for the wheel hub 56. Due to the upper cap member 42 which is bolted to the two vertically split casing members 37 and 38, these casings will be caused to oscillate for steering purposes when the steering rod 44 is oscillated. The two casings 37 and 38 in their oscillation carry with them the spindle 54 which is bolted to housing 38 by bolts 55, thus oscillating the entire assembly on the left side of Figure 1 for steering purposes, the shaft 25 assuming an angular position with respect to the inner member 17 of the universal joint. Due to the multiplicity of balls providing the multiplicity of pivots of the universal joint, a non-accelerating drive is obtained and the balls automatically center themselves so that they form an angle which bisects the axis between the axle 12 and shaft 25. The pilot lever 27 assists in thus positioning the ball race 24 and balls 18. Lubricant may be forced into the joint and the driving connection through the connection 46 and is prevented from escaping due to the packings 14, 76 and 78.

Figure 4 illustrates a modified form of trunnion which is more readily removable. Trunnion 47 has a central opening for reception of a bolt 89 having an enlarged end 91 which overhangs the opening in housing 35. Bolt 89 is secured in position by a nut 92. In this construction, the trunnion need not have a pressed fit with housing 35 since it is retained in position by bolt 89 and nut 92, and replacement of the trunnions is simplified, since the trunnions may be removed after caps 42 have been displaced by merely unscrewing nuts 92.

An extremely compact and simplified design is thus provided by the steering driving wheel construction described. An efficient drive is obtained in which steering is not difficult due to the fact that the center line of the wheel is in close proximity to the center line of the steering trunnion.

Another important advantage of this construction is the fact that access may be readily obtained to the combined anti-friction and thrust bearings 52 by removal of the caps 42. Furthermore, the bearings 52 may be easily adjusted by adjustment of the caps 42 by the shims 87 positioned between the caps 42 and the housings 37 and 38. Since the inner ends of the cap 42 engage the outer race-ways of bearing 52, it will be obvious that by proper adjustment of the shims a close adjustment of the roller bearings 52 may be obtained. Due to the fact that these bearings absorb the thrust of the wheels and transmit the weight of the parts, the principal wear will occur around these bearings. By the novel design as described in this application, these bearings are readily accessible for adjustment or replacement by the mere removal of caps 42. Therefore when the bearings need replacing the caps 42 may be removed without disassembling any of the remaining structure and the roller bearings may be slipped out and new ones positioned therein.

Due to the fact that the trunnions 47 are not integrally formed with the universal joint housings, the trunnions may also be readily removed if they become worn. Another important advantage of providing separate trunnions is the fact that the housing members may be made of lighter construction and cheaper material than if the trunnions were made integral therewith and the trunnions themselves may be made of hardened steel. By this construction, the possibility of warping and thus causing defects of the universal joint housing during hardening process of the trunnion is eliminated.

Several important advantages are obtained by the provision of the vertically split universal casings 37 and 38. The wheel thrust is transmitted to casing 38 and thence by way of the meeting flanges 39 to bearings 52 and trunnions 47 to stationary housing 35 and is not directly imposed upon the connecting bolts, as is the case when the housings are split horizontally. Due to this fact, the housing members may be of lighter and less expensive material, they are more easily machined and are more easily assembled. Furthermore, by the provision of a vertically split universal joint housing with a separate wheel spindle, it is possible to remove the shaft and the universal joint assembly without disturbing the pivot bearings and the trunnions and without disconnecting the gearing mechanism and tie rods.

By the construction of the driving steering wheel as herein described, important economies are obtained in material and in machining of the parts. By making the wheel spindle or knuckle 54 separate from the casing 38, this casing 38 may be a malleable iron casting, whereas the wheel spindle may be of forged steel construction. If these parts are made integral, obviously the entire construction must necessarily be forged from steel, and by making the housing 38 as a casting, it is possible to save approximately one-half the cost of the forged steel member when made integral. Furthermore, the steering spindle or steering knuckle may be forged from much smaller stock than if the casing 38 were made integral therewith. This results in an economy in the material and also enables the forging to be made by less expensive dies.
Further important economies are obtained by the provision of separate trunnions which are detachably connected to the universal joint housing 35. Referring to Figure 5 it will be seen that the trunnionless socket 35 is forged from a bar stock 93, by upsetting and cupping both ends of this bar. In one construction as actually built, it has been found that this trunnionless socket may be made from a straight bar stock of about 4⅜ inch diameter, weighing about 73 pounds for each housing whereas when the socket is made embodying integral trunnions it is impossible to use an upsetting process, it is necessary to use a larger billet or stock of material, and it is extremely difficult to cup either end, requiring much more expensive dies. Furthermore, such a socket with the trunnions formed thereon requires a stock which weighs about 127 pounds for each housing.

It will be obvious therefore, that in addition to the material advantages obtained by being able to replace the trunnions, other important economies are obtained in the manufacture and machining operations.

Referring now to Figure 6 which illustrates the housing member 35 after the machining operations have been made, it will be seen that only three machining operations are necessary. First, it is necessary to machine the inner bore of the housing, the outwardly projecting flange, and the end of the same, all as indicated by reference A. All these surfaces may be machined in one operation. The second machining operation is indicated by the character B and includes the machining of the spherical portion of the housing and of the flat portion on opposite sides thereof through which the holes for the trunnions must be bored. The third operation indicated by character C is the boring of the openings for the trunnion by a boring bar, which may be accomplished in one operation. Thus it will be seen that the forging as made up according to Figure 5 may be machined with three operations, two of which are turning operations and the third is a boring operation with a through bar. If a socket or housing is provided with integral trunnions, at least six separate machining operations are necessary to finish the same. Thus it will be seen that the trunnionless socket may be made up from smaller stock by simpler operations, and subsequent machining operations are greatly simplified and are less expensive.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A steering wheel drive construction comprising a universal joint having two members rotatable together, a housing for said joint, a stub shaft connected to one member of said joint, a spindle on said housing surrounding said stub shaft, spline teeth on the end of said stub shaft, a wheel hub having a sleeve with spline teeth on its inner surface engaged with the spline teeth of said shaft, an outwardly extending shoulder on said stub shaft, a recess provided in said hub and a cup-shaped member seated within said sleeve and engaging said recess, and a bolt secured to said stub shaft and engaging within said cup to maintain the end of the sleeve of said hub in engagement with said shoulder.

2. In a steering drive axle, a universal joint casing comprising a stationary and a movable part, a pair of aligned bearing openings formed in one of said parts, bearing members in said openings, a pair of trunnions formed separate from but fitted into the other housing part in axial alignment, each of said trunnions projecting into one of said bearing members and having an integral flange thereon, said flanges being so disposed that when the universal joint casing is assembled they are in contact with the outer surface of said part into which said trunnions are fitted and also in contact with said bearing members.

3. In a steering drive axle a universal joint casing comprising an open ended stationary part and a movable part adapted to enclose the open end of said stationary part, said movable part comprising two mating members detachably secured together along a substantially vertical joint, a pair of aligned bearing openings formed in said movable part, a wheel carrying spindle and means for detachably securing said spindle to said movable part, a pair of diametrically opposite trunnions fitted in aligned apertures in said stationary member, each of said trunnions comprising a cylindrical bearing receiving portion and a flange of relatively large diameter seated snugly against complemental portions of the surface of said stationary part, and bearing assemblies seated in said bearing openings and surrounding the bearing receiving portions of said trunnions, said bearing assemblies being removable through the open ends of said bearing openings, a member of each of said bearing assemblies resting on the flange of one of said trunnions.

4. In a steering drive axle, a sleeve-like spindle, means pivotally securing said spindle to a stationary vehicle axle member, a wheel hub journaled on said spindle, said hub having an internally splined portion projecting into said spindle, a universal joint, a stub shaft operatively connected to said universal joint, said stub shaft having a splined section engaged with the internal splines on said hub portion, a shoulder on said stub shaft for engagement with the end of said internally splined hub portion, a recess in said hub and means positioned entirely within said recess for drawing the shoulder on said stub shaft against the end of said splined hub portion.

5. A steering wheel drive construction comprising a drive axle, a universal joint device connected to said drive axle, a stub shaft connected to said universal joint, a portion of said stub shaft having external splines and being of reduced diameter to provide a shouldered abutment, a housing for said universal joint device comprising a wheel spindle, radial and thrust anti-friction bearings rotatably supporting a wheel on said spindle, a wheel driving member having an internally splined portion telescoped over said splined stub shaft and abutting said shoulder, a recess adjacent the end of said splined bore, and a flanged cup shaped member seated wholly within said bore with the flange thereof seated in said recess, and a screw extending through an aperture in the bottom of said cup shaped member and threaded into the end of said stub shaft whereby to clamp said stub shaft securely to said driving member.

BEVERLY W. KEESE.